United States Patent [19]
Kulkarni

[11] Patent Number: 4,729,891
[45] Date of Patent: Mar. 8, 1988

[54] HYDROGEN GENERATING METHOD

[76] Inventor: Prabhakar Kulkarni, 12027 Circle Dr. East, Houston, Tex. 77071

[21] Appl. No.: 641,576

[22] Filed: Aug. 16, 1984

[51] Int. Cl.$^4$ ............................................. C01B 13/00
[52] U.S. Cl. ..................... 423/650; 252/373; 423/648 R
[58] Field of Search ............ 423/648 R, 650; 252/373

[56] References Cited

U.S. PATENT DOCUMENTS

| | | | |
|---|---|---|---|
| 1,066,894 | 7/1913 | Fernekes | 423/650 |
| 2,592,377 | 4/1952 | Barr et al. | 423/648 R |
| 3,129,060 | 4/1964 | Pohlenz | 502/39 |
| 3,156,734 | 11/1964 | Happel | 423/650 |
| 3,227,771 | 1/1966 | Happel | 423/650 |
| 4,087,373 | 5/1978 | Reed | 423/648 R |
| 4,435,374 | 3/1984 | Helm | 423/648 R |
| 4,435,376 | 3/1984 | Porter et al. | 423/650 |

FOREIGN PATENT DOCUMENTS

| | | | |
|---|---|---|---|
| 22340 | 9/1892 | United Kingdom | 423/648 R |
| 29624 | 12/1913 | United Kingdom | 423/648 R |

OTHER PUBLICATIONS

Kirk–Othmer, Encyclopedia of Chemical Technology, Third Edition, vol. 12 (1980), John Wiley & Sons, pp. 965, 971, 980.
Merer et al., "Coal Gasification for Industrial Use and Power", C/M Bulletin (Jun., 1978), pp. 72-77.

*Primary Examiner*—John Doll
*Assistant Examiner*—Wayne A. Langel
*Attorney, Agent, or Firm*—Gunn, Lee & Jackson

[57] ABSTRACT

Hydrogen generating method and apparatus are disclosed in the preferred and illustrated embodiment. A feedstock of methane from heated coal and steam or methane obtained by any other means is delivered into a furnace. The furnace (free of oxygen) heats to about 950° F. in vacuum conditions, and converts the methane into elemental carbon and hydrogen gas. The preferred embodiment utilizes an inductive furnace for heating.

14 Claims, 1 Drawing Figure

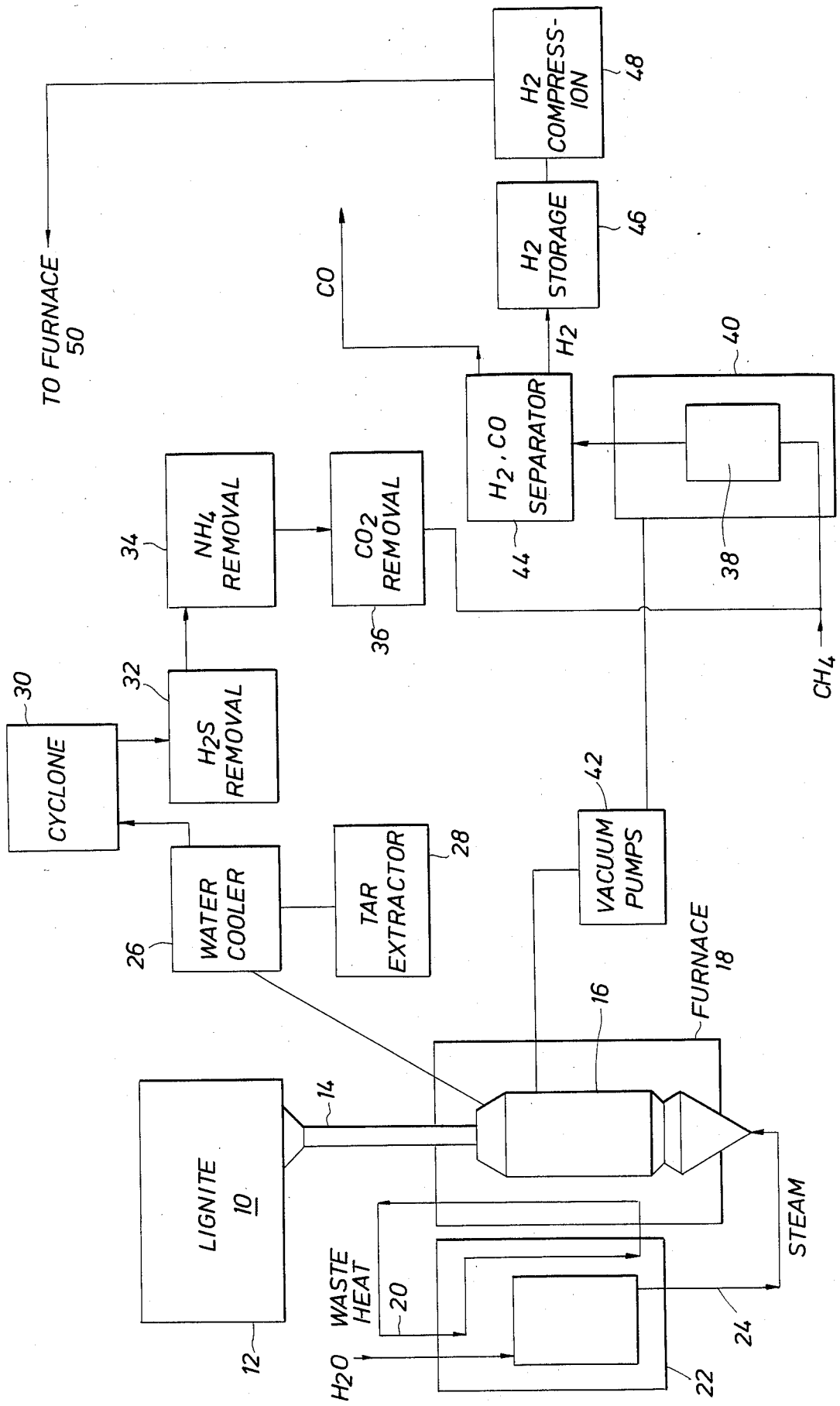

HYDROGEN GENERATING METHOD

BACKGROUND OF THE DISCLOSURE

This disclosure is directed to a hydrogen generating plant and includes both a method and apparatus. It relates to the liberation of hydrogen from methane. While other gases can be used, methane is perhaps the most desireable because it has a relatively high percentage of hydrogen, and is less valuable than other combustible feedstocks. It has a lower caloric content than many feedstocks and the use of methane for conversion into hydrogen is therefore less expensive. Moreover, methane is available in most locales. Probably, it can be obtained pure, or at least nearly so. No particular problem arises if it is mixed with other hydrocarbons such as molecules having a $C_2$ or $C_3$. Methane can also be obtained from other sources and with other insignificant materials mixed in it. As will be described in detail hereinafter, one source of methane is obtained from conversion of coal or relatively low grade lignite. The coal or lignite is treated with steam and liberates a mixture of gases including elemental hydrogen. The mixture may also, however, include CO and $CO_2$. Depending on operation, the process will liberate methane also. It will be observed that CO and $CO_2$ with the flow of methane do not impede conversion so that elemental hydrogen is recovered.

With a view of providing a method and apparatus for the generation of elemental hydrogen, this disclosure sets forth a means for accomplishing that result. One feedstock utilized is coal or low grade lignite. It is processed in a closed furnace, mixed with steam, for the purpose of forming an outflow of gases including methane. The gas is preferably passed through a coolor and various heavy tars are extracted. Particulates are removed with a cyclone separator. Another separator removes hydrogen sulfide, and another separator removes $NH_4$. Likewise, another separator removes carbon dioxide, $CO_2$, to discharge a flow primarily of carbon monoxide, methane and some elemental hydrogen. It is processed in a furnace operated at about 950° F. The vacuum is three inches of mercury or lower. The gas introduced to this furnace (inductively heated) forms an outflow of $H_2$ and CO which is passed through a separator to remove the CO and then $H_2$ is delivered to a storage facility. The process of conversion of methane involves operation at elevated temperature, about 950° F. or above in a vacuum. The vacuum typically measures $10^{-3}$ torr or lower.

BRIEF DESCRIPTION OF THE DRAWING

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The single drawing is a schematic flow diagram of a method of manufacturing hydrogen.

DETAILED DESCRIPTION OF THE PREFERRED EMBODIMENT

This embodiment will be discussed proceeding from the beginning with the supply of a feedstock. To this end, a feedstock typically of coal or low grade lignite is provided at 10. The feedstock is delivered into a container which stores the lignite under vacuum, meaning that it is substantially evacuated. That is, air is removed and a significant vacuum is pulled. The container 12 thus delivers a steady supply of lignite through a conduit 14. The conduit 14 opens into a retort 16 under pressure enclosed in a furnace 18. A pipe 20 conducts a heat transfer fluid which recirculates through the furnace. It picks up heat from the furnace and provides that heat to a heat exchanger 22. The heat exchanger 22 is used to heat a flow of water into steam which is delivered through a pipe 24 into the retort.

The retort is thus charged with crushed lignite through the pipe 14 and receives a steady flow of steam through the conduit 24. Recall that the coal that is introduced is free of entrained gases, especially oxygen and nitrogen. Accordingly, the retort 16 is substantially charged with a supply of carbon (ignoring the ash) and $H_2O$. While there might be a trace of oxygen, nitrogen and sulphur, such content is relatively minimal. On the application of heat in the retort 16, the water and coal are converted into a gaseous outflow including CO, $CO_2$, $CH_4$, $H_2$, and various compounds of trace impurities. They are deliverd as a gaseous flow and passed through a cooling apparatus 26. On cooling, heavy molecules drop out and a tar extraction is achieved at 28. The gas is discharged to a cyclone separator 30. The cyclone separator removes particles carried in the gaseous flow.

The next step is to pass the gaseous flow through a means for moving $H_2S$. Accordingly, this step is identified at 32 where the hydrogen sulfide is removed. Normally, this is relatively small in quantity, and is primarily dependent on the measure of sulfur in the feedstock.

The next step, 34, involves removal of $NH_4$ or ammonia. Again, this derives from trace quantities of nitrogen in the feedstock. Presumably, this is held to a minimum and the quantities of ammonia removed are minimal. The next step involves conducting the gas flow through a carbon dioxide removal step 36. The next step is to introduce the gaseous discharge into a chamber 38. The chamber 38 functions as a retort. It is enclosed in an induction furnace 40. The chamber 38 is connected with a vacuum pump 42 which evacuates the chamber 38. The chamber, or container 38, thus operates at a reduced pressure, typically $10^{-3}$ torr or any attainable lower measure. The furnace 40 is operated to attain a temperature of about 950° F. or higher. The operating range can be between about 900° F. and higher as practical. The gas which is introduced is a mix of elemental hydrogen and methane primarily. It may include trace quantities not recovered by the upstream removal steps. The predominant constituents of the gas flow are $CH_4$, $H_2$, $CO_2$ and CO. Normally, $H_2S$ and $NH_4$ removal is substantially perfect.

It is particularly important to note that methane is introduced into the closed container, or chamber, 38. It can be operated on a batch basis or on a continuous flow basis. In either case, operating at the elevated temperature and achieving a pressure in the range stated above, the $CH_4$ undergoes disassociation. It forms free carbon because, at this juncture, there is very little available for combining with the carbon. It additionally forms free or elemental hydrogen. The discharge from the chamber 38 goes into a CO separator 44. The CO is separated and removed. The elemental hydrogen is then transferred to a hydrogen storage facility 46. The methane injected into the chamber 38 is broken down, ultimately forming the disassociated free hydrogen.

The disassociation step forms carbon. It may collect on the interior surfaces but it generally will also flow out of the equipment in the form of free carbon or carbon black. This can be recovered and is a valuable by-product of methane processing. Generally, a separate market for carbon black is available and the carbon black can be collected and transferred for use elsewhere.

The hydrogen storage device 46 is connected with an output compressor 48 which compresses the hydrogen and delivers it downstream into an evacuated furnace 50. This is for feeding the furnace 50 (along with crushed lignite) for conversion under vacuum and at elevated temperature. This process is set forth in greater detail in application Ser. No. 06/542,276 filed on Oct. 17, 1983 by the present inventor.

Coming back now to focus on the present invention, it will be observed that it operates with a feedstock of methane or $CH_4$. Assume that the methane feed is substantially free of $H_2S$ and $NH_4$. To the degree that $CO_2$ is mixed with it, it is substantially insignificant in altering the conversion. To the extent that the feed does include gases other than these, they are relatively small quantities. A typical feed will thus comprise about 90% or more by weight methane. There might be elemental hydrogen mixed with it. The most common additional material is $CO_2$ which is substantially inert for purposes of the conversion occurring in the chamber 38.

The chamber 38 is preferably operated at about 950° F. The permissive operating range is between 900° and 2000° F. The pressure is held as low as 500 torr, and if sufficient vacuum pump capacity is available, it is lowered below this. While an acceptable pressure is about $10^{-5}$ torr, the preferred operating pressure is about $10^{-3}$ torr. Maintaining a greater vacuum provides added benefits, but it is ordinarily not worth the added utility costs to obtain significantly better vacuum.

The chamber 38 operates substantially free of catalysts. If a catalyst is desired, a suitable catalyst is iron or iron oxides in particulate form.

This procedure is able to accomplish conversion of the intermediate methane $CH_4$ into carbon and elemental hydrogen. By standards prevailing in mid 1984, the utility costs per thousand cubic feet utilizing this procedure appear to be only about a few percent of those normally encountered, and are primarily the cost of operation the furnace 40 and the operation of the vacuum pump 42 to sustain the vacuum in the chamber 38. That is, these two costs are the larger cost components for methane conversion into $H_2$. There is a pumping cost associated with the operation of the compressor downstream to assure that the hydrogen is compressed as it is obtained from the process. Other utility costs will be apparent on review of each step. It will be recalled that the elemental hydrogen is formed and liberated at low pressures but it is typically stored at high pressures. Indeed, storage at high pressure reduces capital costs, and, if desired, the pressure can be raised so high that, accompanied with cooling, the hydrogen can be stored as a liquid in the cryogenic state. That may significantly impact storage volume and materially reduces transportation difficulties.

In the procedure described above, the preferred feedstock is lignite, and even low grade lignite can be used. It should be recognized that lignite does form a known measure of ash which periodically might require removal from the retort 16. An important preliminary step is removal of gases from lignite in the storage container 12. This enables the feed to be deliverd free of oxygen and nitrogen. In the absence of oxygen and nitrogen, the chemical conversion in the retort desired does occur, mainly the formation of oxides of carbon, thereby leaving some free hydrogen. The absence of oxygen and nitrogen (introduced through the lignite) materially enhances this procedure. The retort 16 generates a very substantial flow of methane along with the various oxides of carbon. To the degree that there is elemental hydrogen liberated in the retort 16, that flows along with the outflow and is ultimately passed through the separator 44 for the storage container 46. If the methane volume is insufficient, it can be enhanced by delivery of methane from a separate source, typically separated from natural gas. In either case, the flow of methane with trace or even large quantities of elemental hydrogen and various quantities of oxides of carbon is input to the chamber 38 for conversion in that chamber into carbon black and elemental hydrogen.

Assuming on a continuous flow and further assuming that the retort 16 is substantially free of atmospheric oxygen and nitrogen, the tar extraction 28, particulate removal 30, hydrogen sulfide removal 32, and ammonia removal 34 are steps which are not required to remove excessive quantities from the outflow of retort 16. The bulk of outflow is introduced into the chamber 38 for heating. This reduction of oxygen input, of course, substantially eliminates the risk or chance of explosion in the processing equipment.

As used in the claims occurring hereafter, the term coal includes lignite. The claims determine the scope of the present disclosure.

What is claimed is:

1. A method of extracting elemental hydrogen comprising the steps of:
   (a) heating in a retort coal and steam free of air to convert the coal and steam into a gaseous outflow including oxides of carbon, trace impurities and methane;
   (b) directing the gaseous outflow through gas separation apparatus for removing the oxides and trace impurities from the gaseous outflow resulting in an outflow of methane;
   (c) heating the outflow of methane from the prior step in a chamber at an elevated temperature in the range of 900° F. to 2000° F. and at a reduced pressure in the range of 50 to $10^{-5}$ torr forming a vacuum within said chamber to disassociate methane, the methane forming elemental hydrogen flowing from said chamber; and
   (d) collecting the hydrogen from said chamber.

2. The method of claim 1 wherein the methane is heated in the presence of a catalyst.

3. The method of claim 2 wherein the heating is in an induction furnace.

4. The method of claim 1 including the step of supplying crushed coal from an evacuated chamber.

5. The method of claim 4 wherein steam and heat are supplied continuously to a retort to heat and convert coal and steam therein.

6. The method of claim 1 wherein the methane disassociation forms elemental carbon as carbon black.

7. The method of claim 6 wherein the disassociation forms a flow $H_2$ at reduced pressure and the $H_2$ is then compressed.

8. The method of claim 7 including the step of compressing $H_2$ for delivery to a furance using the $H_2$ as a feed.

9. The method of claim 1 including the step of removing tars.

10. The method of claim 1 including the step of removing ammonia.

11. The method of claim 1 including the step of removing particulates.

12. The method of claim 1 including the step of removing $H_2S$.

13. The method of claim 1 including the step of removing $CO_2$.

14. The method of claim 1 including the step of removing CO.

* * * * *